United States Patent
Heilmann et al.

(10) Patent No.: US 8,836,572 B2
(45) Date of Patent: *Sep. 16, 2014

(54) METHOD FOR DETECTING PRECIPITATION USING A RADAR SENSOR SYSTEM FOR MOTOR VEHICLES

(75) Inventors: Stefan Heilmann, Vaihingen/Enz (DE); Goetz Kuehnle, Hemmingen (DE); Dirk Bechler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 543 days.

This patent is subject to a terminal disclaimer.

(21) Appl. No.: 13/144,907

(22) PCT Filed: Dec. 2, 2009

(86) PCT No.: PCT/EP2009/066217
§ 371 (c)(1),
(2), (4) Date: Sep. 29, 2011

(87) PCT Pub. No.: WO2010/086050
PCT Pub. Date: Aug. 5, 2010

(65) Prior Publication Data
US 2012/0032840 A1    Feb. 9, 2012

(30) Foreign Application Priority Data

Jan. 29, 2009 (DE) .......................... 10 2009 000 469

(51) Int. Cl.
*G01S 13/95* (2006.01)
*G01S 13/93* (2006.01)
*G01S 7/41* (2006.01)

(52) U.S. Cl.
CPC ............... *G01S 13/931* (2013.01); *G01S 13/95* (2013.01); *G01S 7/41* (2013.01)
USPC ............................ 342/70; 342/91; 342/26 R

(58) Field of Classification Search
CPC ...... G01S 13/931; G01S 13/95; G01S 13/956
USPC .......................................... 342/26 R–26 F, 70
See application file for complete search history.

(56) References Cited

U.S. PATENT DOCUMENTS 4,134,677 A * 1/1979 Ling et al. ..................... 356/5.03
4,490,720 A * 12/1984 Kuntman ...................... 342/195

(Continued)

FOREIGN PATENT DOCUMENTS

DE   102006054320   5/2008
JP   4309883        11/1992

OTHER PUBLICATIONS

International Search Report, PCT International Patent Application No. PCT/EP2009/066217, dated Feb. 4, 2010.

(Continued)

*Primary Examiner* — John B Sotomayor
*Assistant Examiner* — Marcus Windrich
(74) *Attorney, Agent, or Firm* — Kenyon & Kenyon LLP

(57) ABSTRACT

A method for detecting precipitation using a radar sensor system for motor vehicles designed for locating objects in the surroundings of the vehicle, in which method a locating signal that is a measure of the received power density as a function of the distance is integrated across a specific distance range lying below a limit distance for detecting precipitation. The locating signal is subjected to a filtering procedure before being integrated, the filtering procedure suppressing the peaks caused by located objects so that the filtered signal forms a measure of the noise level as a function of the distance.

3 Claims, 5 Drawing Sheets

(56) References Cited

U.S. PATENT DOCUMENTS

| | | | |
|---|---|---|---|
| 4,739,327 A * | 4/1988 | Konig et al. | 342/26 B |
| 6,633,815 B1 * | 10/2003 | Winter et al. | 701/301 |
| 7,463,181 B2 * | 12/2008 | Wintermantel | 342/27 |
| 8,203,481 B2 * | 6/2012 | Wintermantel et al. | 342/112 |
| 8,558,730 B2 * | 10/2013 | Hassen | 342/26 R |
| 8,581,774 B2 * | 11/2013 | Heilmann et al. | 342/26 R |
| 2010/0309041 A1 * | 12/2010 | Hassen | 342/26 R |

OTHER PUBLICATIONS

Stephen Blake, "OS-CFAR Theory for Multiple Targets and Nonuniform Clutter", IEEE Transactions on Aerospace and Electronic Systems, vol. 24, No. 6, Nov. 1988, pp. 785-790, XP002564047 USA ISSN: 0018-9251.

* cited by examiner

METHOD FOR DETECTING PRECIPITATION USING A RADAR SENSOR SYSTEM FOR MOTOR VEHICLES

FIELD OF THE INVENTION

The present invention relates to a method for detecting precipitation using a radar system for motor vehicles designed for locating objects in the surroundings of the vehicle, in which method a locating signal that is a measure of the received power density as a function of the distance is integrated across a specific distance range lying below a limit distance for detecting precipitation.

BACKGROUND INFORMATION

Radar sensor systems are frequently used in driver assistance systems for motor vehicles, for example, for an automatic distance regulation or for early detection of the risk of a collision.

Precipitation in the form of rain or spray splashed up from the road may reflect a portion of the emitted radar beam, thus causing the range of the radar beam and accordingly the locating depth of the radar sensor to be reduced. For purposes of traffic safety it is important that such a limitation of the function of the radar sensor system can be detected as immediately as possible.

German Patent Application No. DE 10 2006 054 320 A1 describes a method for a multi-beam radar, specifically for an FMCW radar sensor system. In this method, the locating signals of multiple radar beams are each integrated separately and the resulting integrals are compared with one another.

The functional principle of an FMCW radar sensor system (frequency modulated continuous wave) is that the radar signal is sent continuously; however, the frequency of this signal is modulated periodically using up and down ramps (the term "ramp" in this case is not intended to mean that the frequency modulation must necessarily be linear within the "ramp.") A mixer mixes a portion of the transmission signal with the signal received from the antenna and thus produces a mixed product, the frequency of which corresponds with the difference between the frequency of the instantaneous transmission signal and the frequency of the received signal.

When a radar echo is received from a located object, the frequency of the mixed product is thus a function of the signal transit time and accordingly the distance of the object but also of the relative velocity of the reflecting object due to the Doppler Effect. In the spectrum formed from the mixed product, each located object is therefore distinguished on each modulation ramp as a peak in the frequency as a function of the distance and the relative velocity. By comparing the frequency positions of peaks—originating from the same object—on modulation ramps having a varying gradient, it is possible to determine the distance and the relative velocity of the object.

Raindrops or splashed up spray also represent "objects" in this sense, which leave behind a weak but nonetheless still detectable peak in the spectrum at distances from the radar sensor that are not too great, for example at distances up to about 10-50 m. In heavy precipitation, these peaks add up in the frequency range corresponding to the distance range referred to above to form a background signal, the so-called rain clutter. The output of this rain clutter is thus a measure of the presence and intensity of precipitation.

However, if "genuine" objects such as preceding vehicles are present in the locating range of the radar sensor and within the distance interval across which integration is performed, such vehicles producing a significantly more pronounced peak in the spectrum, the integral is falsified by these peaks so that it may no longer be used as a reliable indicator of precipitation. Therefore, it is only possible to use the conventional method in scenarios in which no genuine objects are present in the locating range in question.

SUMMARY

An object of the present invention is to provide a method for detecting precipitation which is more robust with regard to such interferences.

According to the present invention, this objective may be achieved in that the locating signal is subjected to a filtering procedure before being integrated, the filtering procedure suppressing the peaks caused by located objects so that the filtered signal forms a measure of the background noise level as a function of the distance.

In a method according to an example embodiment of the present invention, genuine objects such as preceding vehicles and the like are screened out to a certain degree by the filtering procedure so that the subsequent integration generally detects only the signal components caused by noise and rain clutter (collectively designated here as "background"). In the case of precipitation, the rain clutter causes the integral to assume a significantly higher value than in the case without precipitation in which the integrand is generally determined only by the noise level. In the case of FMCW radar, a further advantage is that the example method is also independent of the special selection of the parameters of the modulation ramps.

In one advantageous specific embodiment, the integrand is a detection threshold which is obtained through a noise estimation and may simultaneously be used to differentiate between the genuine object peaks and noise background (and from rain clutter if necessary). Such noise estimation may, for example, be implemented using a priority filter and is known in the literature as "ordered statistic constant false alarm rate" (OS-CFAR) Ludloff: Practical Knowledge of Radar and Radar Signal Processing, 3rd edition, Vieweg Verlag 2002).

BRIEF DESCRIPTION OF THE DRAWINGS

One exemplary embodiment of the present invention is shown in the figures and explained in greater detail below.

DETAILED DESCRIPTION OF EXAMPLE EMBODIMENTS

Figure 1:
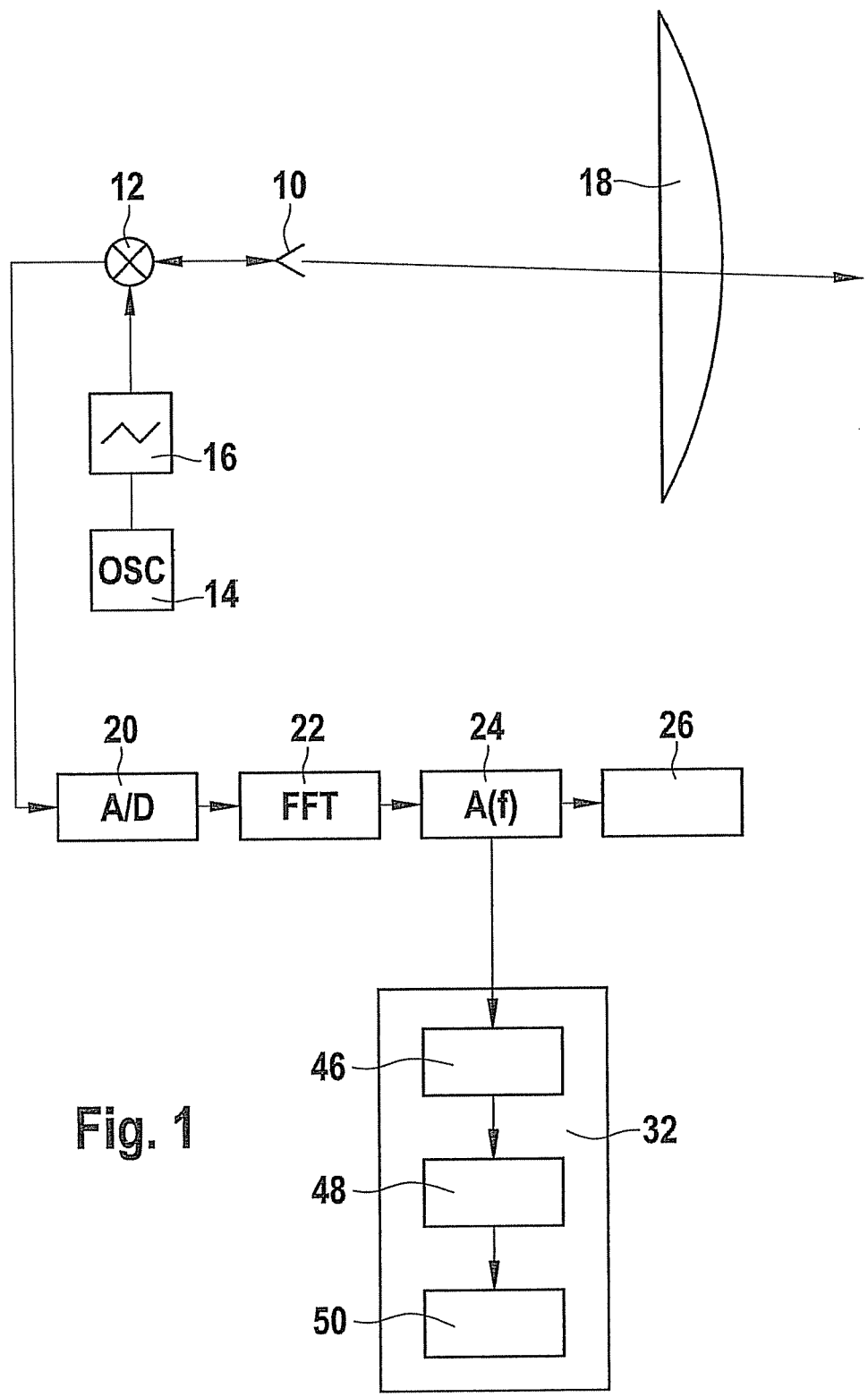
FIG. 1 shows a block diagram of a radar sensor system which may be used to implement a method according to an example embodiment of the present invention.

The radar sensor system shown in FIG. 1 has an antenna 10 to which a transmission signal generated by an oscillator 14 and frequency modulated by a modulator 16 is fed via a mixer 12 (FMCW radar). The signal emitted by antenna 10 is bundled by a radar lens 18.

As soon as the radar sensor system locates an object (not shown in FIG. 1), the lens bundles the signal reflected on the object back to the same antenna 10 that emitted the transmission signal (monostatic antenna concept). The received signal is mixed with a component of the transmission signal in mixer 12, and a time-dependent signal (intermediate frequency signal) which is sampled and digitized in an analog/digital converter stage 20 is obtained as the mixed product. In a transformation stage 22, the digitized signal is, for example, converted by a Fast Fourier Transformation (FFT) into a spectrum, hereinafter referred to as locating signal 24, which indicates the dependence of the amplitude of the mixed product on frequency f. If the Doppler Effect is disregarded, frequency f is proportional to distance R of the particular reflection target. The relative velocity of the raindrops is roughly equal in amount to the velocity of the vehicle equipped with the radar system. This relative velocity therefore leads to a frequency shift that may be determined by way of calculation. At least within specific limits, it may thus be said that locating signal 24 is indirectly also a measure of the received power density as a function of distance R. In the following, the locating signal is thus to be considered—in a somewhat simplified manner—as a function of the distance. In an evaluation stage 26, locating signal 24 is evaluated further to determine the distances and relative velocities of the located objects and—in the case of multi-beam radar—their azimuth angle as well.

Figure 2:
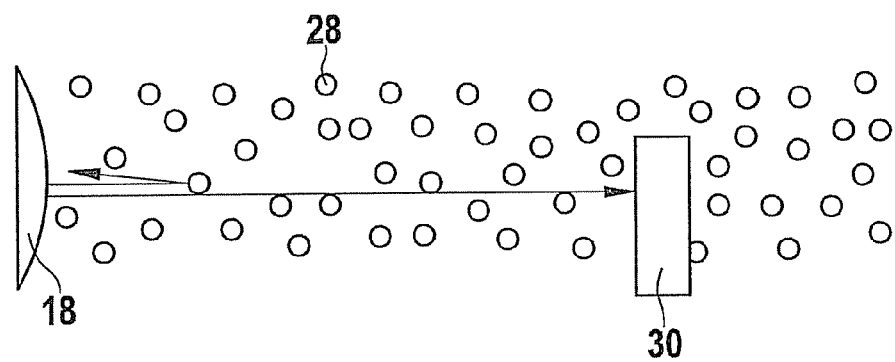
FIG. 2 shows a schematic diagram for detecting precipitation.

FIG. 2 shows precipitation in the form of drops 28 filling up the entire space between radar lens 18 and an object 30 to be located. Each of drops 28 acts like a small reflection target that leaves behind a small peak in the spectrum, i.e., in locating signal 24. These peaks are scattered across a broad frequency band and contribute to the background as so-called rain clutter, however only up to a specific frequency limit that corresponds to limit distance $R_{lim}$ in which a radar echo from the individual raindrops is still identifiable (approximately 10 to 50 m in practice). On the other hand, the reflections on individual drops 28 attenuate the radar signal that reaches object 30 and is received again by the locating device after being reflected. In the case of very heavy rain, for example, this may result in considerably limiting the sensitivity of the locating device.

For that reason, the radar sensor system has a detection unit 32 that makes it possible to detect the presence of precipitation and quantitatively evaluate the intensity of the precipitation, so that an estimation may be made as to the degree to which the precipitation unfavorably affects the functionality of the locating system. To this end, detection unit 32 evaluates locating signal 24, as described in greater detail in the following.

Figure 3:
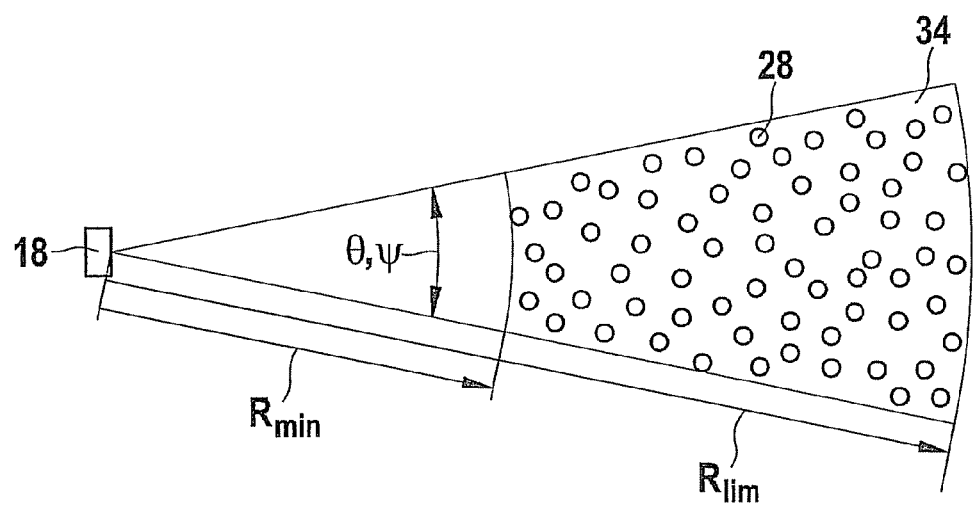
FIG. 3 shows an example of a radar cell for detecting precipitation.

FIG. 3 schematically shows a radar cell 34, within which rain clutter may be detected. Radar cell 34 extends across a specific azimuth angle range in the horizontal and across a specific elevation angle range in the vertical. These angle ranges are determined by the form of the radar lobes emitted by the radar sensor system. In the radial direction, radar cell 34 extends from a specific minimum distance $R_{min}$, below which a reliable locating of reflection targets is no longer possible, to the mentioned limit distance $R_{lim}$, up to which the radar echo of individual drops 28 is still measurable as rain clutter.

Figure 4:
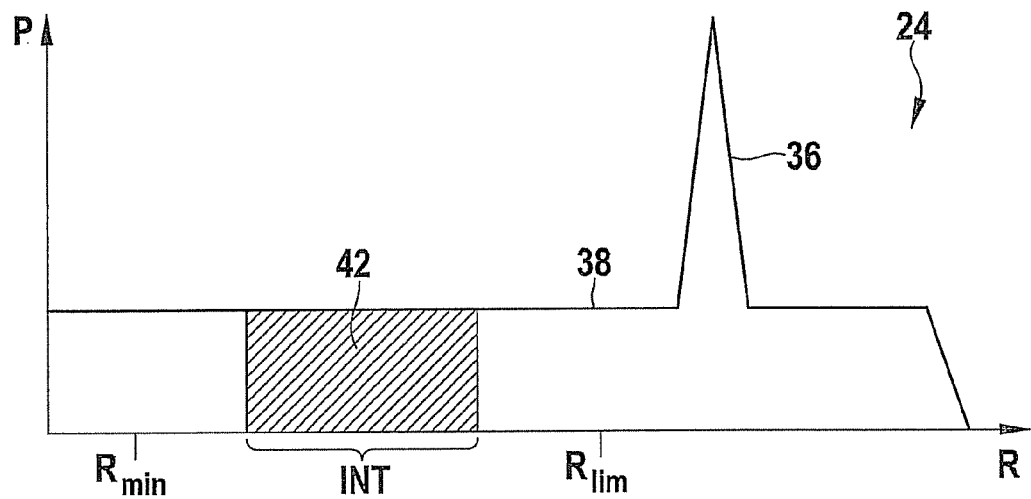
FIGS. 4 and 5 show examples of locating signals with and without precipitation.

FIG. 4 schematically shows a typical curve of locating signal 24 for the case where no precipitation is present. In the example shown, a peak 36, which stands out clearly from noise background 38, represents a located object, the distance of which is, in this case, however, greater than limit distance $R_{lim}$ for detecting precipitation. For all other frequencies and distances, the height of locating signal 24 is provided here by the level of noise background 38 which is approximately constant over the entire distance range.

Figure 5:
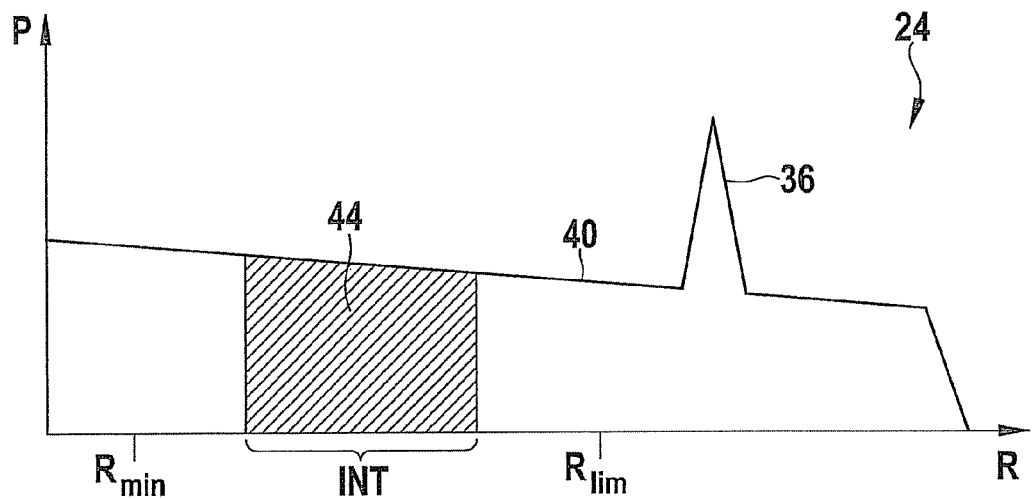

For comparison, FIG. 5 shows the schematic curve of locating signal 24 with precipitation. The attenuation of the radar signal due to the reflection on drops 28 initially has the result that the height of peak 36 is reduced. On the other hand, the reflection on these drops gives rise to the mentioned rain clutter, which in FIG. 5 may be seen outside of peak 36 in the form of a background signal 40, which is higher than noise background 38 in FIG. 4 and also decreases as the distance increases. Starting from limit distance $R_{lim}$, it is no longer possible to differentiate between the rain clutter and the normal noise background and it is therefore no longer detectable.

A detection of precipitation is now possible in principle by integrating the power density of locating signal 24 across a distance interval INT which lies between minimum distance $R_{min}$ and limit distance $R_{lim}$. The appropriate integrals are represented by the surface areas of shaded areas 42, 44 in FIGS. 4 and 5. As normal noise background 38 is known for a given type of the radar sensor system, the value of the integral represented by area 42 is also known, and if the current value of the integral is significantly greater in relation to area 44 in FIG. 5, this suggests the presence of precipitation, and the value represented by the difference between areas 44 and 42 indicates a measure of the intensity of the precipitation.

Figure 6:
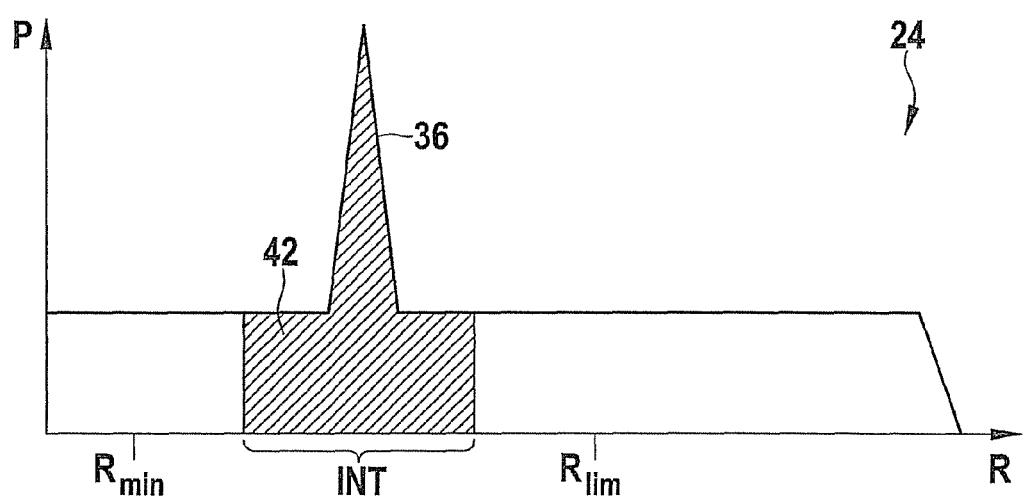
FIG. 6 shows the impact of an object on the integral of the locating signal.

If however, as in the case illustrated in FIG. 6, at least one object (peak 36) is located in distance interval INT, across which the precipitation detection is to be integrated, the surface area of area 42 increases even in a precipitation-free case and accordingly the value of the integral surrounding the surface area of peak 36 also increases, and it is not possible to decide if the increase of the integral is caused solely by the object or by precipitation, too.

In the method provided here, locating signal 24 is not integrated directly for that reason, but instead this locating signal is first subjected to a filtering procedure, for example to a noise estimation, which is used to determine a detection threshold for each frequency value above which a peak 36 caused by an object must at least rise to make it possible to reliably detect the relevant object.

For that reason, detection unit 32 in FIG. 1 includes a filter stage 46 for the noise estimation, an integration stage 48 for integrating the filtered signal, and a comparison stage 50 for comparing the integral with the known interval across the detection threshold in the absence of precipitation.

Figure 7:
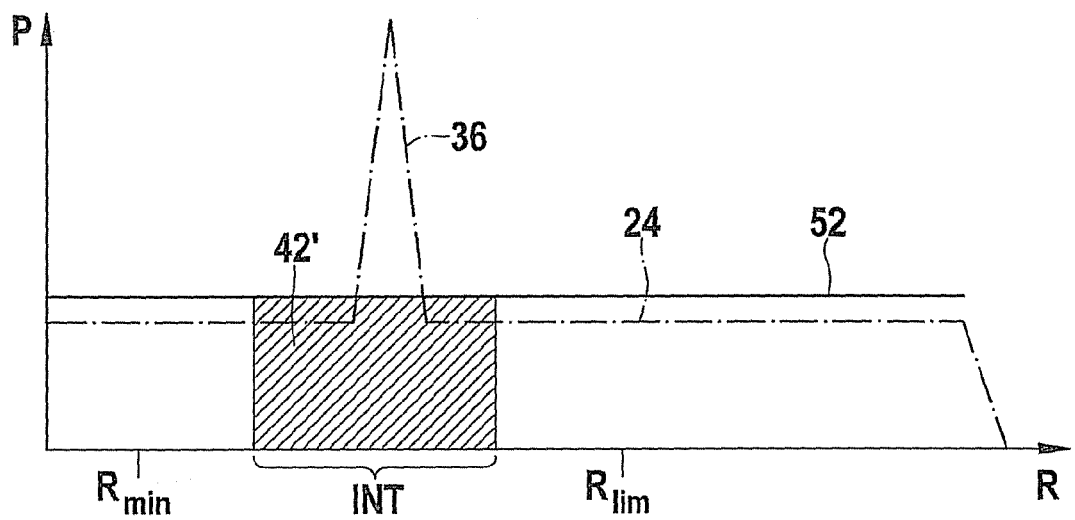
FIGS. 7 and 8 show examples of the evaluation of locating signals using the example method according to the present invention.
Figure 8:
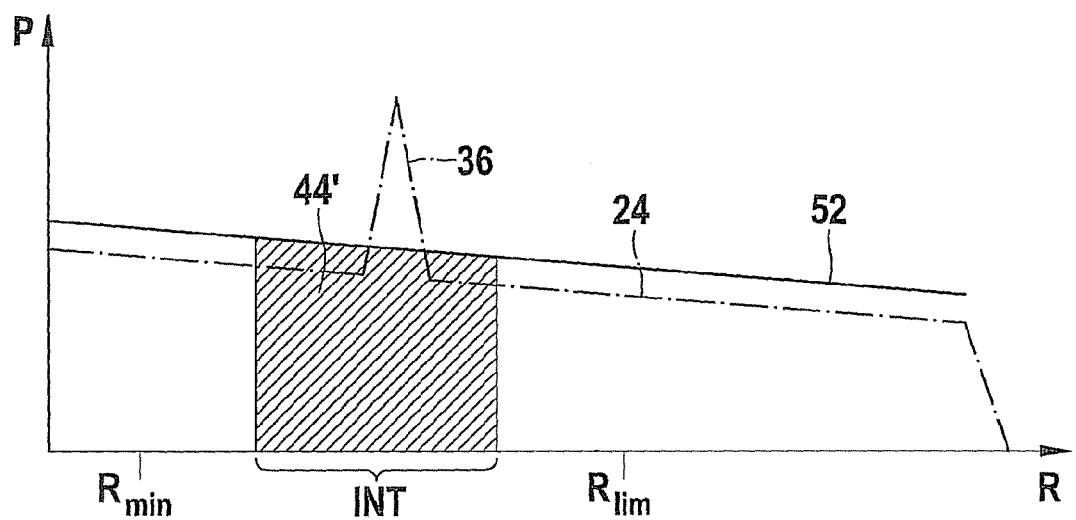

In FIGS. 7 and 8, of which FIG. 7 again represents the condition without precipitation and FIG. 8 represents the condition with precipitation, locating signal 24 is in each case indicated by a dot-dash curve while detection threshold 52 (as a function of R) is indicated by a continuous curve. As seen in FIGS. 7 and 8, detection threshold 52 runs roughly parallel to the background signal (specifically: at an approximately constant distance above this background signal), while it to a certain degree "screens out" each peak 36 originating from an object. If detection threshold 52 is integrated across interval INT, the obtained integrals (area 42' in FIG. 7 and area 44' in FIG. 8) are independent of whether an object is or is not located in interval INT. Comparing the integrals in comparison stage 50 therefore makes it possible to reliably determine whether precipitation is or is not present, and the detection method is robust with regard to the presence or absence of objects in the relevant distance range.

While the spectrum of the intermediate frequency signal is evaluated in the example shown, in a modified specific embodiment it is also possible to accordingly evaluate the time signal received in analog/digital converter stage 20.

What is claimed is:

1. A method for detecting precipitation using a radar sensor system for a motor vehicle designed for locating an object in surroundings of the vehicle, the method comprising:
    receiving, by the radar sensor system, a locating signal that represents a measure of a received power density as a function of a distance across a specific distance range lying below a limit distance for detecting precipitation;
    filtering, by a filter stage of a computerized detection unit associated with the radar sensor system, the locating signal to provide a filtered signal, representing a measure of a background noise level as a function of the distance, wherein the filtered signal is formed by disregarding peaks in the locating signal caused by located objects;
    integrating, by an integration stage of the computerized detection unit, the filtered signal to obtain an integral; and
    comparing, by a comparison stage of the computerized detection unit, the integral to a predetermined threshold to determine whether precipitation is present.

2. The method as recited in claim 1, wherein the filtered signal further represents a detection threshold that allows a decision to be made as to whether a peak in the locating signal which exceeds the detection threshold represents a located object.

3. A radar sensor system for a motor vehicle designed for locating an object in surroundings of the vehicle, the system comprising:
    a receiving unit receiving a locating signal that represents a measure of a received power density as a function of a distance across a specific distance range lying below a limit distance for detecting precipitation; and
    a computerized detection unit having:
        a filter stage configured to filter the locating signal to provide a filtered signal representing a measure of a background noise level as a function of the distance, wherein the filtered signal is formed by disregarding peaks in the locating signal caused by located objects;
        an integration stage configured to integrate the filtered signal to obtain an integral; and
        a comparison stage configured to compare the integral to a predetermined threshold to determine whether precipitation is present.

* * * * *